(12) United States Patent
Takeno et al.

(10) Patent No.: US 12,244,073 B2
(45) Date of Patent: *Mar. 4, 2025

(54) COMMUNICATION DEVICE

(71) Applicant: TOSHIBA TEC KABUSHIKI KAISHA, Tokyo (JP)

(72) Inventors: Yuishi Takeno, Shizuoka (JP); Hiroyuki Ishikawa, Shizuoka (JP); Keita Yamazaki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 17/860,805

(22) Filed: Jul. 8, 2022

(65) Prior Publication Data

US 2023/0077472 A1    Mar. 16, 2023

(30) Foreign Application Priority Data

Sep. 14, 2021 (JP) .................... 2021-149352

(51) Int. Cl.
*H01Q 3/02* (2006.01)
*G06K 7/10* (2006.01)
*G06Q 20/20* (2012.01)
*G08B 21/18* (2006.01)

(52) U.S. Cl.
CPC ........... *H01Q 3/02* (2013.01); *G06K 7/10316* (2013.01); *G06Q 20/208* (2013.01); *G08B 21/182* (2013.01)

(58) Field of Classification Search
CPC .............. H01Q 1/2216; G07G 1/0081; G06K 7/10316; G06K 7/10415; G06Q 20/208; G06Q 10/087
See application file for complete search history.

(56) References Cited

U.S. PATENT DOCUMENTS

| | | | |
|---|---|---|---|
| 10,860,818 B2 | 12/2020 | Oishi | |
| 2006/0214792 A1* | 9/2006 | Goyal | G06Q 10/087 340/572.1 |
| 2010/0039237 A1* | 2/2010 | Radhakrishnan | G06K 7/10435 29/592.1 |
| 2014/0361077 A1* | 12/2014 | Davidson | G06Q 10/087 235/385 |
| 2015/0304611 A1* | 10/2015 | Nakase | H04N 7/18 348/143 |
| 2021/0174328 A1* | 6/2021 | Kojima | G06Q 10/087 |

* cited by examiner

*Primary Examiner* — Mirza F Alam
(74) *Attorney, Agent, or Firm* — FOLEY & LARDNER LLP

(57) ABSTRACT

A wireless tag that is not guaranteed to be located within a predetermined area is prevented from being read as a valid wireless tag. A communication device includes: an antenna; a reference tag; a reception unit; and a determination unit. The reception unit uses the antenna to sequentially receive signals wirelessly transmitted from a reference tag whose relative position to the antenna is known and a reading target tag different from the reference tag. The determination unit determines that the signal transmitted from the reading target tag and received by the reception unit is invalid based on a phase of the signal transmitted from the reference tag and received by the reception unit.

6 Claims, 8 Drawing Sheets

COMMUNICATION DEVICE

CROSS-REFERENCE TO RELATED PATENT APPLICATION

This application is based upon and claims the benefit of priority from Japanese Patent Application No. 2021-149352, filed on Sep. 14, 2021, the entire contents of which are incorporated herein by reference.

FIELD

Embodiments described herein relate generally to a communication device.

BACKGROUND

For example, when identifying a commodity put in a shopping basket through wireless communication with a wireless tag attached to the commodity put in the shopping basket, if wireless communication with a wireless tag not put in the shopping basket is established accidentally, a commodity attached with the wireless tag may be erroneously identified as a commodity put in the shopping basket.

Therefore, there is a technique for measuring a phase of a signal transmitted from a wireless tag while changing a relative position between an antenna and the wireless tag, and confirming whether the wireless tag is located within a predetermined area based on a phase difference therebetween.

DETAILED DESCRIPTION

In the above-mentioned technique, since the phase of the signal transmitted from the wireless tag changes according to a distance between the wireless tag and the antenna and a surrounding environment, whether the wireless tag is located within a predetermined area may not be correctly determined depending on various conditions.

Under such circumstances, it is desired to be able to prevent a wireless tag that is not guaranteed to be located within a predetermined area from being read.

In general, according to one embodiment, a communication device capable of preventing a wireless tag that is not guaranteed to be located within a predetermined area from being read as a valid wireless tag is provided.

A communication device according to an embodiment includes an antenna, a reception unit, and a determination unit. The reception unit uses the antenna to sequentially receive signals wirelessly transmitted from a reference tag whose relative position to the antenna is known and a reading target tag different from the reference tag. The determination unit determines that the signal transmitted from the reading target tag and received by the reception unit is invalid based on a phase of the signal transmitted from the reference tag and received by the reception unit.

Hereinafter, two embodiments will be described with reference to the drawings. In each embodiment, a tag reading device configured to have a function as a communication device will be described as an example.

Prior to descriptions of each embodiment, configurations common to each embodiment will be described.

Figure 1:
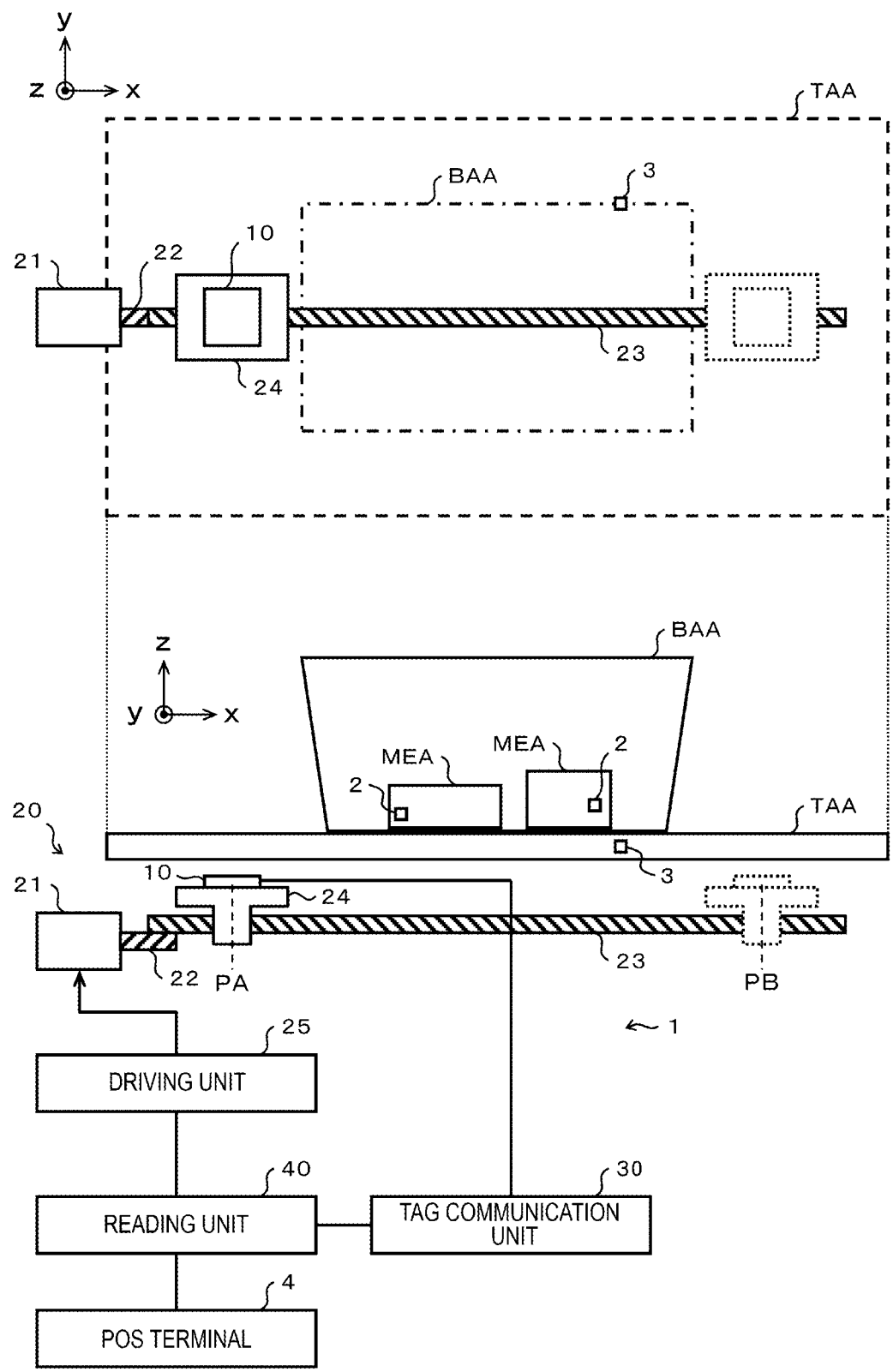
FIG. 1 is a diagram illustrating a configuration of a tag reading device.

FIG. 1 is a diagram illustrating a configuration of a tag reader or tag reading device 1 for a commodity registration or point-of-sale system (POS) according to each embodiment. In FIG. 1, a part of a structure of the tag reading device 1 is schematically illustrated. In addition, in FIG. 1, a part of a circuit configuration of the tag reading device 1 is illustrated in a block diagram.

The tag reading device 1 reads tag data stored in a wireless tag 2 attached to a commodity MEA (hereinafter referred to as a commodity tag) and a wireless tag 3 attached to a table TAA (hereinafter referred to as a reference tag). The commodity tag 2 is an example of a reading target tag. The tag reading device 1 generates a commodity list indicating a list of purchased commodities based on the read tag data, and outputs the commodity list to a POS terminal 4. The tag reading device 1 is typically used in a posture in which an x-y plane in FIG. 1 is a horizontal plane. The table TAA may be one of the components of the tag reading device 1, or a table TAA separate from the tag reading device 1 may be disposed as illustrated in FIG. 1.

The wireless tag used as the commodity tag 2 or the reference tag 3 is also referred to as a radio frequency identification (RFID) tag. The commodity tag 2 and the reference tag 3 include a memory and store tag data written in advance. The commodity tag 2 and the reference tag 3 wirelessly transmit the stored tag data while communicating with the tag reading device 1 in a predetermined sequence. The tag data stored in the commodity tag 2 and the reference tag 3 includes a tag code as an identifier for identifying each of the commodity tag 2 and the reference tag 3. In addition, the tag data stored in the commodity tag 2 includes a commodity code as an identifier for identifying the commodity MEA attached with the commodity tag 2. The commodity code may be included as a part of the tag code or may be different from the tag code. The commodity code is, for example, a Japanese Article Number (JAN) code.

On an upper surface of the table TAA, the commodity MEA is placed in a state of being accommodated in, for example, a basket BAA. A position at which the basket BAA in the table TAA is placed is defined as a position illustrated in FIG. 1. The commodity MEA may also be directly placed on the table TAA, in which case the position at which the commodity is placed is in an area occupied by the basket BAA placed at the defined position as illustrated in FIG. 1 on the table TAA. Thus, the area where the commodity MEA is placed on the table TAA is an area occupied by the basket BAA placed at the defined position as illustrated in FIG. 1 on the table TAA. Therefore, the area is hereinafter referred to as a placement area.

The reference tag 3 is embedded in the table TAA, for example. The reference tag 3 may be attached to the table TAA by any method, such as being attached to the upper surface, a lower surface, or the like of the table TAA. The reference tag 3 is attached to the table TAA such that an installation position thereof does not change. The installation position of the reference tag 3 may be near a boundary of the placement area as illustrated in FIG. 1.

The tag reading device 1 includes an antenna 10, a movement mechanism 20, and a control system including a tag communication unit 30 and a reading unit 40 (a reader). In FIG. 1, regarding the antenna 10 and the movement mechanism 20, a lower portion of the schematic shows an appearance in an x-z plane, and an upper portion of the schematic shows an appearance in the x-y plane.

The antenna 10 radiates a radio wave corresponding to a transmission high-frequency signal supplied from the tag communication unit 30. The antenna 10 receives radio waves radiated from the commodity tag 2 and the reference tag 3, and outputs an electric signal corresponding to the radio waves as a reception high-frequency signal. The antenna 10 is disposed below the table TAA, and is capable of communicating with the commodity tag 2 and the reference tag 3 located in a reading space and a space around the reading space. The reading space is, for example, predetermined as a space above the table TAA. The reading space is, for example, assumed to be predetermined as a space including the basket BAA placed on the table TAA. The reading space may be appropriately determined by, for example, a designer of the tag reading device 1.

The movement mechanism 20 moves the antenna 10. The tag communication unit 30 executes communication for reading the tag data. The reading unit 40 executes information processing for generating a commodity list as, for example, a list relating to the commodity MEA placed in the placement area in a state of being accommodated in the basket BAA based on a reading result of the tag communication unit 30.

The movement mechanism 20 includes a driving source 21 (a driver, an actuator, etc.), a rotating shaft 22, a rail 23, a stage 24, and a driving unit 25. The driving source 21 generates power for moving the antenna 10. The driving source 21 is, for example, a stepping motor. The rotating shaft 22 is obtained by forming a spiral groove in a side surface of an elongated columnar member, bar, or shaft. The rotating shaft 22 rotates about a straight line along an x-axis direction in FIG. 1 by the power generated by the driving source 21.

The rail 23 is obtained by forming a spiral groove in the side surface of the elongated columnar member so as to mesh with the spiral groove formed on the rotating shaft 22. The rail 23 is disposed in a state in which the spiral groove formed at one end thereof meshes with the spiral groove of the rotating shaft 22, and is rotatably supported by a support mechanism (not illustrated) about the straight line along the x-axis direction in FIG. 1.

The stage 24 has a through hole in which a spiral groove is formed inside, and is disposed in a state in which the rail 23 penetrates through the through hole. The antenna 10 is fixed or coupled to an attachment surface formed on an upper side of the stage 24. A posture of the stage 24 is limited by a guide rail (not illustrated) so as to maintain a state in which the attachment surface faces upward. It is desirable that the stage 24 is maintained in a state in which an upper surface thereof coincides with the x-y plane. Therefore, the stage 24 moves in the x-axis direction as the rail 23 rotates. Due to the movement of the stage 24, the antenna 10 is moved in the x-axis direction.

The driving unit 25 drives the driving source 21 so as to move the stage 24 from a predetermined start point PA to an end point PB. The driving unit 25 monitors a position of the stage 24 and notifies the reading unit 40 of the position as a reading position. In addition, when the position of the stage 24 reaches the end point PB, the driving unit 25 notifies the reading unit 40 of end of the movement. The driving unit 25 includes, for example, a home position sensor that detects a state in which the stage 24 is located at the start point PA, and monitors the position of the stage 24 based on a detection result of the home position sensor and a driving amount of the driving source 21. Alternatively, the driving unit 25 may include a sensor that detects a current position of the stage 24, and the position of the stage 24 may be monitored by any method, such as being monitored based on an output of the sensor.

Figure 2:
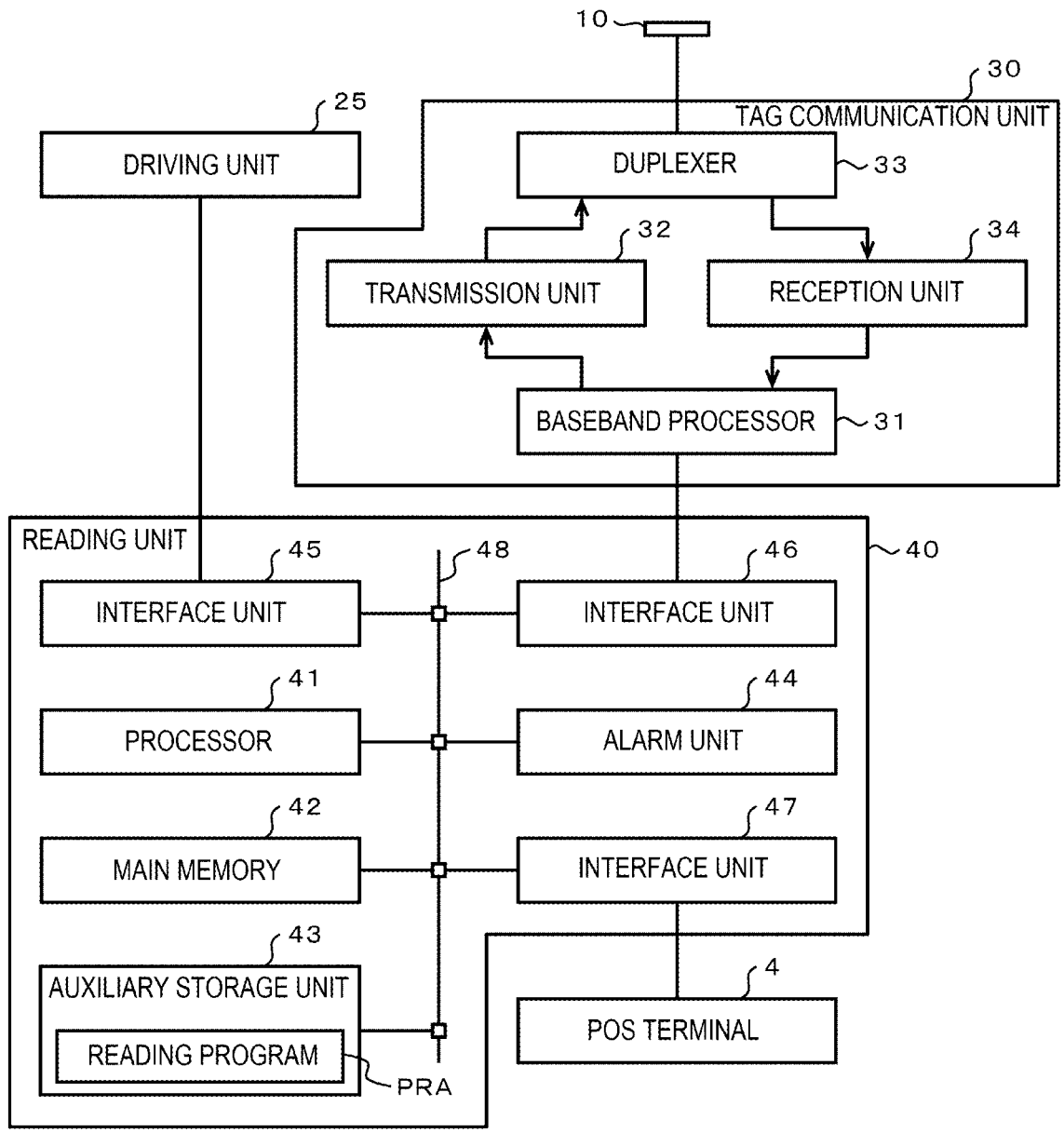
FIG. 2 is a block diagram illustrating a main circuit configuration of a tag communication unit and a reading unit.

FIG. 2 is a block diagram illustrating a main circuit configuration of the tag communication unit 30 and the reading unit 40. Among elements illustrated in FIG. 2, elements illustrated in FIG. 1 are denoted by the same reference numerals. The tag communication unit 30 includes a baseband processor 31, a transmission unit 32 (a transmitter), a duplexer 33, and a reception unit 34 (a receiver).

The baseband processor 31 generates, under an instruction from the reading unit 40, a transmission baseband signal for radiating a radio wave from the antenna 10 in order to read the tag data from each of a plurality of commodity tags 2 and the reference tags 3 in a predetermined sequence, and provides the transmission baseband signal to the transmission unit 32. The transmission unit 32 performs well-known processing such as carrier wave modulation by using the transmission baseband signal provided from the baseband processor 31 to obtain a transmission high-frequency signal, and provides the transmission high-frequency signal to the duplexer 33. The duplexer 33 supplies the transmission high-frequency signal provided from the transmission unit 32 to the antenna 10. The duplexer 33 supplies the reception high-frequency signal output from the antenna 10 to the reception unit 34.

The reception unit 34 performs well-known processing such as demodulation on the reception high-frequency signal provided from the duplexer 33 to obtain a reception baseband signal, and provides the reception baseband signal to the baseband processor 31. The reception unit 34 detects phases of the radio waves received by the antenna 10 based on the reception high-frequency signal, and provides phase information indicating the phases to the baseband processor 31. That is, the reception unit 34 has a function as a reception unit.

The baseband processor 31 attempts to extract the tag data from the reception baseband signal provided from the reception unit 34. If the tag data can be extracted, the baseband processor 31 outputs the tag data to the reading unit 40. The baseband processor 31 outputs the phase information provided from the reception unit 34 as detected from the reception baseband signal, which is an extraction source of the tag data, to the reading unit 40 together with the tag data.

The reading unit 40 includes a processor 41, a main memory 42, an auxiliary storage unit 43, an alarm unit 44

(an alarm), interface units 45, 46, and 47 (interfaces), and a transmission path 48. The processor 41, the main memory 42, the auxiliary storage unit 43, the alarm unit 44, and the interface units 45, 46, and 47 can communicate with each other via the transmission path 48.

The processor 41, the main memory 42, and the auxiliary storage unit 43 are connected by the transmission path 48 to constitute a computer that performs information processing.

The processor 41 corresponds to a central part of the computer. The processor 41 executes various information processing according to an information processing program such as an operating system, middleware, and an application program. The information processing executed by the processor 41 includes information processing described later for generating a commodity list.

The main memory 42 corresponds to a main storage part of the computer. The main memory 42 includes a non-volatile memory area and a volatile memory area. The main memory 42 stores information processing programs in the non-volatile memory area. In addition, the main memory 42 may store data necessary for the processor 41 to execute processing for controlling each unit in the non-volatile or volatile memory area. The main memory 42 uses the volatile memory area as a work area in which the data is appropriately rewritten by the processor 41.

The auxiliary storage unit 43 corresponds to an auxiliary storage part of the computer. As the auxiliary storage unit 43, for example, well-known storage devices such as an electric erasable programmable read-only memory (EEPROM), a hard disc drive (HDD), and a solid state drive (SSD) can be used alone or in combination. The auxiliary storage unit 43 stores data used when the processor 41 performs various processing and data generated by the processing in the processor 41. The auxiliary storage unit 43 stores information processing programs. One of the information processing programs stored in the auxiliary storage unit 43 is an information processing program that describes the information processing for generating a commodity list.

The alarm unit 44 issues an alarm of an abnormality to an operator. The alarm unit 44 may appropriately include various well-known devices that issue any alarm such as ringing, light emission, display, and audio reproduction.

The driving unit 25 is connected to the interface unit 45. The baseband processor 31 is connected to the interface unit 46. The POS terminal 4 is connected to the interface unit 47. The interface units 45, 46, and 47 interface exchange of data between the driving unit 25, the baseband processor 31, or the POS terminal 4 and the processor 41. As the interface units 45, 46, and 47, for example, a well-known interface device for connecting a peripheral device to a computer device can be used.

The transmission path 48 includes an address bus, a data bus, a control signal line, and the like, and transmits data and a control signal exchanged between the connected units.

The configurations described so far are common between a first embodiment and a second embodiment. Next, an operation of the tag reading device 1 in each of the first embodiment and the second embodiment will be described. A content of processing described below is merely an example, and it is possible to appropriately change the order of some of the processing, omit some of the processing, add another processing, and the like.

First Embodiment

An operator of the POS terminal 4 places the basket BAA, in which the commodity MEA desired to be purchased by a customer is placed, in the placement area on the table TAA, and then instructs to start reading by a predetermined operation. The operator of the POS terminal 4 may be either a clerk or a customer. When an operation for such an instruction is performed, the POS terminal 4 requests the tag reading device 1 to read.

The request from the POS terminal 4 is taken into the reading unit 40 by the interface unit 47. Then, the processor 41 executes reading described below according to the information processing programs stored in the main memory 42 or the auxiliary storage unit 43.

Figure 3:
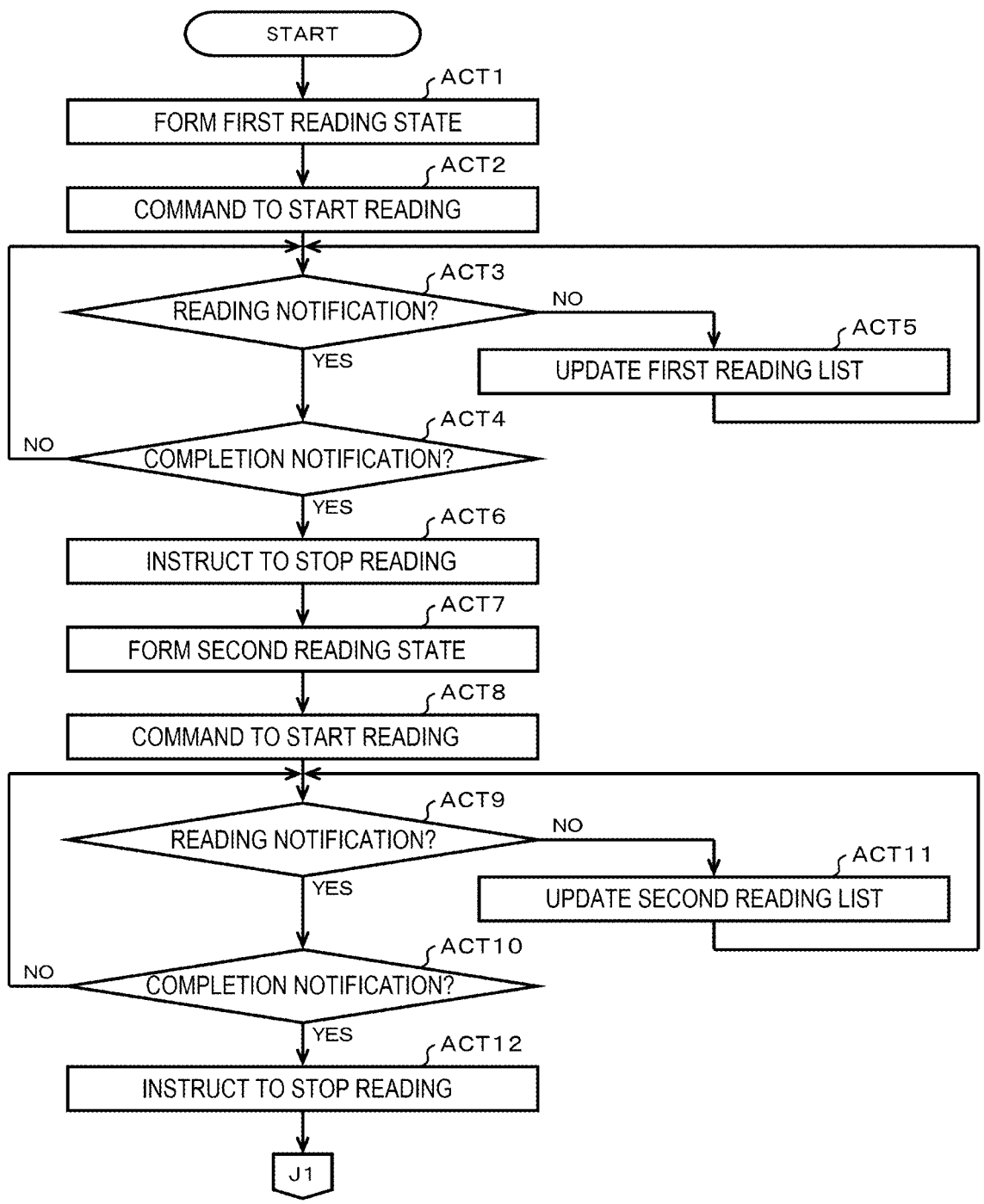
FIG. 3 is a flowchart of reading processing in a first embodiment by a processor.
Figure 4:
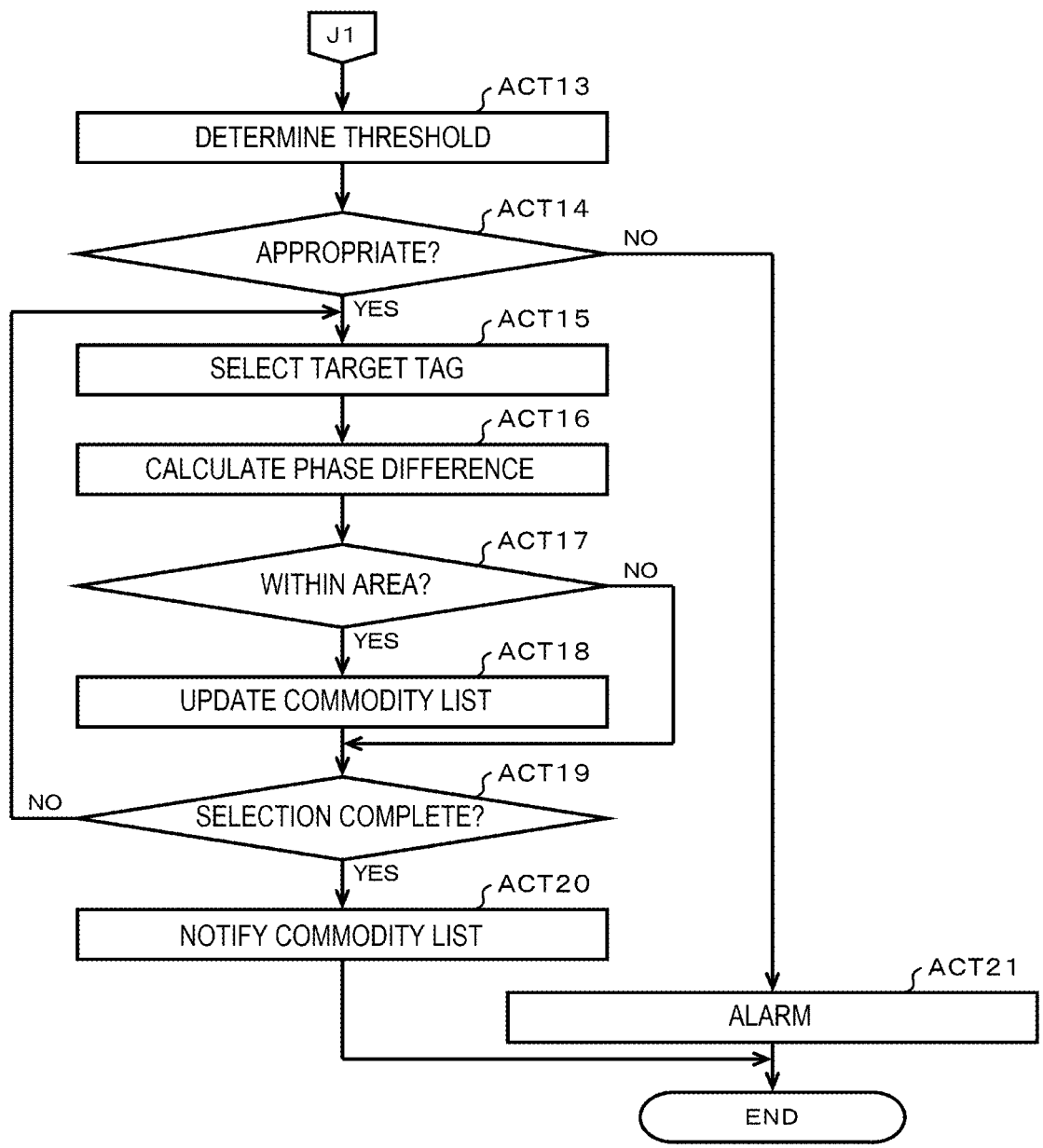
FIG. 4 is a flowchart of the reading by the processor.

FIGS. 3 and 4 are flowcharts of the reading in the first embodiment by the processor 41.

In ACT 1, the processor 41 forms a first reading state. In the first reading state, the stage 24 is located at a predetermined first reading position. The first reading position is assumed to be, for example, the start point PA. The first reading position may also be determined by, for example, the designer of the tag reading device 1. Then, for example, the processor 41 commands the driving unit 25 to set the position of the stage 24 to the first reading position. For example, the processor 41 sends a predetermined command signal for this command from the interface unit 45. Upon receiving the command, the driving unit 25 operates the driving source 21 to move the stage 24 to the first reading position. If the reading position notified from the driving unit 25 coincides with the first reading position, the processor 41 does not need to command the driving unit 25.

In ACT 2, the processor 41 commands the tag communication unit 30 to start reading the tag data of the wireless tag 2. The processor 41 sends, for example, a predetermined command signal for commanding the start of the reading from the interface unit 45.

In the tag communication unit 30, the baseband processor 31 receives the command signal. Then, the baseband processor 31 outputs the transmission baseband signal to the transmission unit 32 and extracts the tag data from the reception baseband signal provided by the reception unit 34 in order to read tag data from all communicable wireless tags 2 by using a predetermined protocol. When the tag data is successfully extracted, the baseband processor 31 notifies the reading unit 40 of a reading notification. In this reading notification, the baseband processor 31 notifies the tag data and the phase information provided by the reception unit 34. The protocol may be a well-known protocol such as an ISO/IEC 18000 compliant protocol. The baseband processor 31 performs a series of processing for reading the tag data sequentially from each of the communicable wireless tags 2 only once or a plurality of times. The number of times the baseband processor 31 performs the series of processing in response to a command to start reading at a time may be determined by, for example, the designer of the tag reading device 1. When a predetermined number of times of the series of processing is ended, the baseband processor 31 notifies the reading unit 40 of a completion notification of the reading.

In a situation where the tag data is read as described above, the processor 41 proceeds to a standby state of ACT 3 and ACT 4.

In ACT 3, the processor 41 confirms whether the reading notification is issued. If this event cannot be confirmed, the processor 41 determines as NO and proceeds to ACT 4.

In ACT 4, the processor 41 confirms whether the completion notification is issued. If this event cannot be confirmed, the processor 41 determines as NO and returns to ACT 3.

Thus, in the standby state of ACT 3 and ACT 4, the processor 41 stands by for the reading notification or the completion notification.

Then, when the reading notification issued by the baseband processor 31 is received by the interface unit 46 as described above, the processor 41 determines as YES in ACT 3, and proceeds to ACT 5.

In ACT 5, the processor 41 updates a first reading list. The first reading list is list data indicating a history of the reading of the tag data in the first reading state. The first reading list is a set of data records respectively associated with reading notifications each time. When ACT 5 is executed for the first time after starting the reading, the processor 41 generates a new data record and generates a new first reading list including only the one data record. When ACT 5 is executed starting from the second time, the processor 41 generates a new data record and updates the first reading list already present so as to add the data record. The first reading list is stored in the main memory 42 or the auxiliary storage unit 43.

Figure 5:
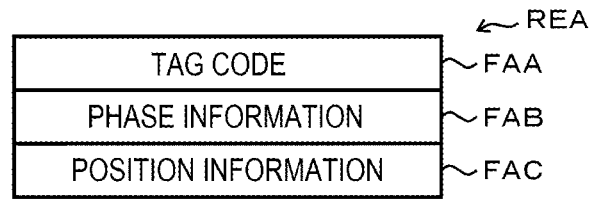
FIG. 5 is a diagram schematically illustrating a configuration of one data record constituting a reading list.

FIG. 5 is a diagram schematically illustrating a configuration of one data record REA constituting the first reading list.

The data record REA includes fields FAA, FAB, and FAC. The processor 41 sets a tag code included in the tag data notified by the reading notification as an individual identifier of the wireless tag 2 in the field FAA. The processor 41 sets the phase information notified by the reading notification in the field FAB. When the reading notification is issued, the processor 41 sets position information indicating the reading position notified by the driving unit 25 in the field FAC. The data record REA may not include the field FAC.

In ACT 2, instead of the position information, the processor 41 may set an elapsed time from a time when the reading is started in the field FAC. In this case, the driving unit 25 does not need to notify the reading unit 40 of the position information.

Then, when the update of the first reading list is ended, the processor 41 returns to the standby state of ACT 3 and ACT 4. Thus, each time new tag data is read by the tag communication unit 30, the processor 41 records the phase information and the position information in association with a tag code included in the tag data. Then, when the completion notification issued by the baseband processor 31 in order to notify completion of the reading is received by the interface unit 46, the processor 41 determines as YES in ACT 4, and proceeds to ACT 6.

In ACT 6, the processor 41 commands the tag communication unit 30 to stop the reading. The processor 41 sends, for example, a predetermined command signal for commanding the stop of the reading from the interface unit 45. In the tag communication unit 30, the baseband processor 31 receives the command signal. Then, the baseband processor 31 stops the processing for reading the tag data.

Accordingly, the processor 41 generates the first reading list as list data in which the phase information and the position information are recorded in association with the tag code included in the tag data read in the first reading state.

In ACT 7, the processor 41 forms a second reading state. In the second reading state, the stage 24 is located at a predetermined second reading position so as to be different from the first reading position. The second reading position is assumed to be, for example, the end point PB. The second reading position may also be determined by, for example, the designer of the tag reading device 1. The second reading position is determined so as to have a separation distance from the reference tag 3 different from a separation distance between the first reading position and the reference tag 3. Then, for example, the processor 41 commands the driving unit 25 to set the position of the stage 24 to the second reading position. For example, the processor 41 sends a predetermined command signal for this command from the interface unit 45. Upon receiving the command, the driving unit 25 operates the driving source 21 to move the stage 24 to the second reading position. Thus, the movement mechanism 20 corresponds to a movement unit.

In ACT 8, the processor 41 commands the tag communication unit 30 to start reading the tag data of the wireless tag 2 in the same manner as in ACT 2. In response to the command, the tag communication unit 30 operates in the same manner as described above, and reads the tag data.

In a situation where the tag data is read by the tag communication unit 30, the processor 41 proceeds to a standby state of ACT 9 and ACT 10. In the standby state, the processor 41 stands by for the reading notification or the completion notification as in the standby state of ACT 3 and ACT 4.

Then, when the reading notification issued by the baseband processor 31 is received by the interface unit 46, the processor 41 determines as YES in ACT 9, and proceeds to ACT 11.

In ACT 11, the processor 41 updates a second reading list. The second reading list is list data indicating a history of the reading of the tag data in the second reading state. The second reading list is list data having the same structure as the first reading list, and is a set of data records REA illustrated in FIG. 4. When ACT 11 is executed for the first time after starting the reading, the processor 41 generates a new data record and generates a new second reading list including only the one data record. When ACT 11 is executed starting from the second time, the processor 41 generates a new data record and updates the second reading list already present so as to add the data record. The second reading list is stored in the main memory 42 or the auxiliary storage unit 43.

Then, when the update of the second reading list is ended, the processor 41 returns to the standby state of ACT 9 and ACT 10. Thus, each time new tag data is read by the tag communication unit 30, the processor 41 records the phase information and the position information in association with a tag code included in the tag data. Then, when the completion notification issued by the baseband processor 31 in order to notify completion of the reading is received by the interface unit 46, the processor 41 determines as YES in ACT 10, and proceeds to ACT 12.

In ACT 12, the processor 41 commands the tag communication unit 30 to stop the reading in the same manner as in ACT 6. In the tag communication unit 30, the baseband processor 31 receives the command signal. Then, the baseband processor 31 stops the processing for reading the tag data.

Accordingly, the processor 41 generates the second reading list as list data in which the phase information and the position information are recorded in association with the tag code included in the tag data read in the second reading state. Thereafter, the processor 41 proceeds to ACT 13 in FIG. 4.

In ACT 13, the processor 41 determines a threshold. For example, the threshold is determined as follows. The processor 41 searches for a data record REA in which the tag code of the reference tag 3 is set in the field FAA from each of the first reading list and the second reading list. Then, the processor 41 sets a phase indicated by phase information set in a field FAB of the data record REA searched from the first reading list to a first phase. In addition, the processor 41 sets a phase indicated by phase information set in a field FAB of the data record REA searched from the second reading list to a second phase. Further, the processor 41 obtains a phase difference as [first phase−second phase], and sets the phase difference as the threshold. The processor 41 may obtain the phase difference as [second phase−first phase] and set the phase difference as the threshold.

In ACT 14, the processor 41 confirms whether the threshold determined in ACT 13 is appropriate. For example, the processor 41 confirms whether the threshold determined in ACT 13 is within a predetermined allowable range. Here, since the reference tag 3 is attached to the table TAA such that the installation position thereof does not change, a separation distance between the antenna 10 and the reference tag 3 is known in each of the first reading state and the second reading state. A phase of a radio wave radiated from the reference tag 3 and reaching the antenna 10 is determined according to the separation distance between the antenna 10 and the reference tag 3 if an environment is constant. However, the phase of the radio wave radiated from the reference tag 3 and reaching the antenna 10 fluctuates due to a change in the environment. Therefore, based on a phase of a radio wave radiated from the reference tag 3 and reaching the antenna 10 in a typical environment, an allowable (permissible) range is predetermined as a phase range including the phase. The allowable range may be appropriately determined by, for example, the designer or the like of the tag reading device 1 based on an experiment, a simulation, an empirical rule, or the like. If the threshold determined in ACT 13 is within the allowable range, the processor 41 assumes the threshold is appropriate and determines as YES and proceeds to ACT 15.

In ACT 15, the processor 41 selects one of the commodity tags 2 as a target tag. For example, when one of the data records REA included in the first reading list is selected and the tag code set in the field FAA of the data record REA is not the tag code of the reference tag 3, the processor 41 searches for a data record REA in which the tag code is set in the field FAA from the second reading list. For example, if the corresponding data record REA is found, the processor 41 sets a commodity tag 2 identified by the tag code as the target tag.

In ACT 16, the processor 41 calculates a phase difference relating to the target tag. For example, the phase difference is calculated as follows. The processor 41 sets a phase indicated by phase information set in the field FAB of a data record REA in which a tag code of the target tag is set in a field FAA among the data records REA included in the first reading list as a first phase difference. For example, the processor 41 sets a phase indicated by phase information set in the field FAB of a data record REA in which the tag code of the target tag is set in the field FAA among the data records REA included in the second reading list as a second phase difference. Further, the processor 41 obtains the phase difference as [first phase−second phase]. The processor 41 may also obtain the phase difference as [second phase−first phase].

In ACT 17, the processor 41 confirms whether a position of the target tag is within the placement area. For example, the processor 41 compares the phase difference calculated in ACT 16 with the threshold, and determines whether the position of the target tag is within the placement area based on a result. For example, if the phase difference calculated in ACT 16 is less than the threshold, the processor 41 assumes that the position of the target tag is within the placement area, and determines as YES and proceeds to ACT 18.

Figure 6:
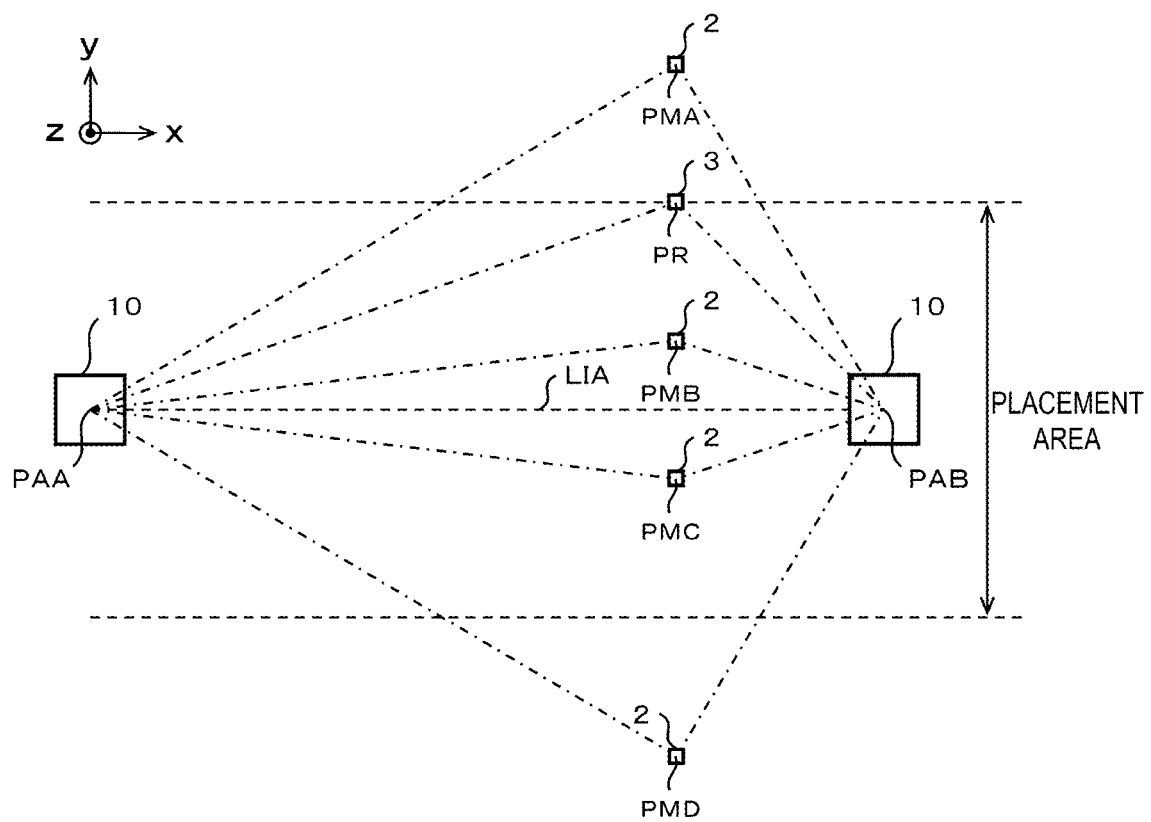
FIG. 6 is a diagram for explaining a principle of determining whether a position of a target tag is within a placement area.

FIG. 6 is a diagram for explaining a principle of determining whether the position of the target tag is within the placement area.

In FIG. 6, positions PAA and PAB are positions of the antenna 10 in each of the first reading state and the second reading state. Positions PMA, PMB, PMC, and PMD are positions of four commodity tags 2, respectively. Position PR is a position of the reference tag 3.

A difference DIA between (i) a distance DAA from the position PAA to the position PMA and (ii) a distance DAB from the position PAB to the position PMA, a difference DIB between (i) a distance DAB from the position PAA to the position PMB and (ii) a distance DBB from the position PAB to the position PMB, and a difference DIR between (i) a distance DAR from the position PAA to the position PR and (ii) a distance DBR from the position PAB to the position PR are in a relationship of DIB>DIR>DIA.

That is, the commodity tag 2 and the reference tag 3 have a smaller difference in a separation distance from the antenna 10 when the first reading state is changed to the second reading state as a separation distance from a straight line LIA connecting the positions PAA and PAB are larger. Thus, the difference DIB DIA in a separation distance relating to a commodity tag 2 located at the position PMA outside the placement area in a y direction is larger than the difference DIR in a separation distance relating to the reference tag 3. In addition, the difference DIB in a separation distance relating to a commodity tag 2 located at the position PMB inside the placement area in the y direction is larger than the difference DIR in the separation distance relating to the reference tag 3. Therefore, whether a position of the commodity tag 2 is within the placement area can be determined according to the difference in the separation distance relating to the commodity tag 2 based on the difference DIR in the separation distance relating to the reference tag 3.

Regarding the position PMD in which a separation distance from the straight line LIA in the y direction is equal to a separation distance from the position PMA, a difference in the separation distance is also equal to that of the position PMA. Regarding the position PMC in which the separation distance from the straight line LIA in the y direction is equal to a separation distance from the position PMB, a difference in the separation distance is also equal to that of the position PMB. Therefore, if the placement area is defined such that a center of the placement area in the y direction substantially coincides with the straight line LIA, a boundary of the placement area on a side where the reference tag 3 is not installed can also be determined in the same manner as described above based on the difference DIR in the separation distance relating to the reference tag 3.

If there is no phase fluctuation due to the change in the environment, the phase differences calculated in ACT 13 and ACT 16 are smaller as the difference in the separation distance is larger. Therefore, whether the position of the target tag is within the placement area can be determined by the processing in ACT 17. Thus, by executing the reading based on the information processing program by the processor 41, the computer including the processor 41 as a central part functions as a confirmation unit that confirms that the commodity tag 2 is located within the placement area that is used as a reading area.

In ACT 18, the processor 41 updates the commodity list. The commodity list is list data of commodities purchased by the customer. For example, when ACT 18 is executed for the first time after starting the reading, the processor 41 generates a new commodity list including only one commodity code included in the tag code of the target tag or one commodity code previously associated with the tag code of the target tag. When ACT 18 is executed starting from the second time, the processor 41 adds a commodity code of the target tag to the commodity list if the commodity code is not included in the commodity list, and increases a quantity of the commodity code by one if the commodity code is included. The commodity list is stored in the main memory 42 or the auxiliary storage unit 43. The commodity list is list data relating to the commodity tag 2 confirmed to be located within the placement area that is used as a reading area. Thus, by executing the reading based on the information processing program by the processor 41, the computer including the processor 41 as a central part functions as a generation unit.

If the update of the commodity list is ended, the processor 41 proceeds to ACT 19. For example, if the phase difference calculated in ACT 16 is equal to or larger than the threshold, the processor 41 assumes that the position of the target tag is not within the placement area, and determines as NO, and proceeds to ACT 19 skipping ACT 18. That is, the processor 41 does not add the commodity list to a commodity MEA to which the commodity tag 2 determined to be located outside the placement area is attached. At this time, the processor 41 assumes that a signal received from the target tag is invalid, and discards a reading result from the target tag. Thus, by executing the reading based on the information processing program by the processor 41, the computer including the processor 41 as a central part functions as a determination unit.

In ACT 19, the processor 41 confirms whether all the commodity tags 2 satisfying a condition for selecting as the target tag in ACT 15 are selected as target tags. If commodity tags 2 to be selected as the target tag remain, the processor 41 determines as NO and repeats the processing starting from ACT 15. However, at this time, in ACT 15, the processor 41 selects a commodity tag 2 that is not selected as the target tag. Accordingly, the processor 41 repeats the processing of ACT 15 to ACT 19 while sequentially setting each of the commodity tags 2 whose tag data could read in both the first reading state and the second reading state as the target tag.

If each of the corresponding commodity tags 2 is selected as the target tag, the processor 41 assumes the commodity tags 2 are selected in ACT 19, and determines as YES and proceeds to ACT 20. In ACT 20, the processor 41 notifies the POS terminal 4 of the commodity list. Then, the processor 41 ends the reading.

Incidentally, when the environment changes greatly due to a disturbance such as a large metal body being mixed in or near the reading space, the principle described with reference to FIG. 6 may not be satisfied. When such a change in the environment occurs, the phase difference calculated for the reference tag 3 whose separation distance from the antenna 10 is known, that is, the threshold determined in ACT 13, is greatly deviated from a logically assumed value. Therefore, for example, when the threshold is out of the allowable range, the processor 41 assumes that the threshold is not appropriate in ACT 14, and determines as NO, and proceeds to ACT 21.

In ACT 21, the processor 41 issues an alarm. The alarm is for warning the operator or the like that it may be not possible to correctly register the commodity. For example, the processor 41 causes the alarm unit 44 to perform a predetermined operation as an alarm operation for the warning. Thus, by the processor 41 reading based on the information processing program, the computer including the processor 41 as a central part functions as an alarm unit. If a predetermined alarm releasing condition is satisfied, the processor 41 ends the alarm and then ends the reading. In this case, the processor 41 does not execute ACT 15 to ACT 20. The releasing condition may also be determined by the designer or a user of the tag reading device 1, for example, when the POS terminal 4 notifies that a predetermined releasing operation is performed on the POS terminal 4, or when a duration of the alarm operation exceeds a predetermined time limit.

As described above, the tag reading device 1 according to the first embodiment determines whether an indefinite position of the commodity tag 2 is within the placement area by comparing the phase difference relating to the reference tag 3, whose separation distance from the antenna 10 is known in both the first reading state and the second reading state, with the phase difference relating to the commodity tag 2. The tag reading device 1 uses a tag code read from the commodity tag 2 determined to be located within the placement area as a valid tag code. Therefore, according to the tag reading device 1, even communication with the commodity tag 2 located outside the placement area is possible, and a commodity tag 2 that is not guaranteed to be located within the placement area can be prevented from being read as a valid commodity tag 2.

When a phase difference different from the phase difference calculated in a normal environment is calculated for the reference tag 3, whose separation distance from the antenna 10 is known in both the first reading state and the second reading state, the change in the environment is large and whether the commodity tag 2 is within the placement area may not be correctly determined, or the communication with the commodity tag 2 may not be normally performed. Therefore, the tag reading device 1 according to the first embodiment issues an alarm without generating the commodity list based on the reading result. This prevents erroneous commodity registration in such an environment. Based on the alarm, the customer or the clerk can take measures such as removing the cause of the disturbance, and can quickly perform the commodity registration in the normal environment.

Second Embodiment

The second embodiment is different from the first embodiment in reading by the processor 41.

Figure 7:
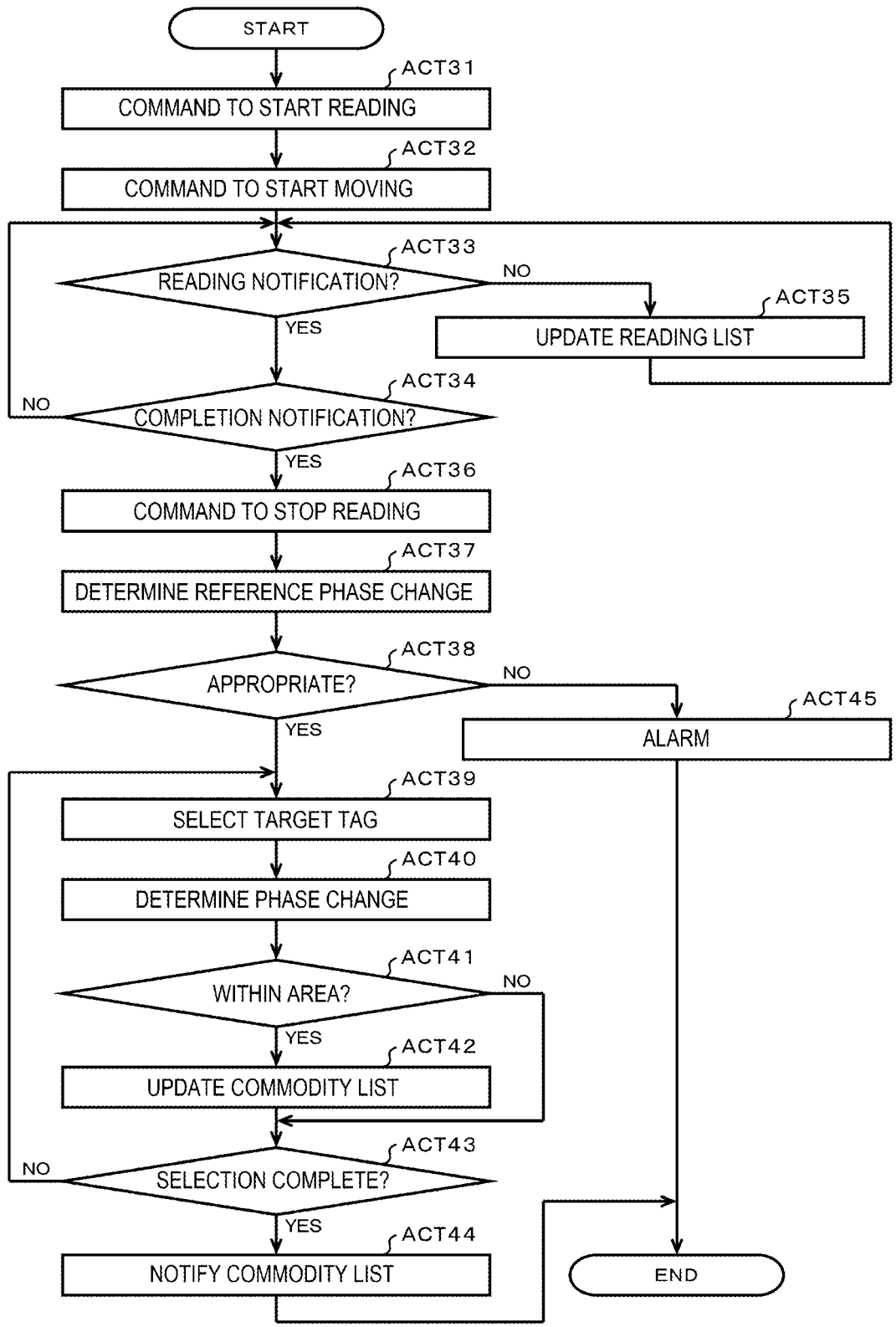
FIG. 7 is a flowchart of reading in a second embodiment by the processor.

FIG. 7 is a flowchart of the reading in the second embodiment by the processor 41.

In ACT 31, the processor 41 commands the tag communication unit 30 to start reading the tag data. In response to this, the tag communication unit 30 starts the same operation as in the first embodiment.

In ACT 32, the processor 41 commands the movement mechanism 20 to start moving. The processor 41 sends, for example, a predetermined command signal for commanding the start of the moving from the interface unit 45.

In the movement mechanism 20, the driving unit 25 receives the command signal. Then, the driving unit 25 starts driving for rotating the driving source 21 in a predetermined forward rotation direction. The driving unit 25 monitors the position of the stage 24 based on a rotation amount of the driving source 21, and notifies the reading unit 40 of position information indicating the position. The driving unit 25 stops the driving source 21 when the position of the stage 24 reaches the end point PB. At this time, the driving unit 25 transmits a notification signal for completion notification to the reading unit 40. Thereafter, the driving unit 25 starts driving for rotating the driving source 21 in a reverse rotation direction. The driving unit 25 stops the driving source 21 when the position of the stage 24 reaches the start point PA.

In a situation where the tag data is read while moving the antenna 10 as described above, the processor 41 proceeds to a standby state of ACT 33 and ACT 34.

In ACT 33, the processor 41 confirms whether the reading notification is issued. If this event cannot be confirmed, the processor 41 determines as NO and proceeds to ACT 34.

In ACT 34, the processor 41 confirms whether the completion notification is issued. If this event cannot be confirmed, the processor 41 determines as NO and returns to ACT 33.

Thus, in the standby state of ACT 33 and ACT 34, the processor 41 stands by for the reading notification or the completion notification.

Then, when the reading notification issued by the baseband processor 31 is received by the interface unit 46 as described in the first embodiment, the processor 41 determines as YES in ACT 33 and proceeds to ACT 35.

In ACT 35, the processor 41 updates the reading list. The reading list may be the same as the first reading list in the first embodiment.

Then, when the update of the reading list is ended, the processor 41 returns to the standby state of ACT 33 and ACT 34. Thus, each time new tag data is read by the tag communication unit 30, the processor 41 records the phase information and the position information in association with a tag code included in the tag data. Then, when the interface unit 45 receives the notification signal for the completion notification transmitted from the driving unit 25 because the position of the stage 24 reaches the end point PB, the processor 41 determines as YES in ACT 34 and proceeds to ACT 36.

In ACT 36, the processor 41 commands the tag communication unit 30 to stop the reading. In the tag communication unit 30, the baseband processor 31 receives the command signal. Then, the baseband processor 31 stops the processing for reading the tag data.

Accordingly, the processor 41 generates the reading list as list data in which the phase information and the position information are recorded in association with the tag code included in the tag data read during a period in which the stage 24 is moved from the start point PA to the end point PB (hereinafter referred to as a reading period).

The driving of the driving source 21 by the driving unit 25 may be ended in accordance with a stop command by the processor 41. In this case, for example, when the position of the stage 24 reaches the end point PB, the driving unit 25 transmits the notification signal for completion notification to the reading unit 40 without ending the driving by the driving unit 25. Then, if ACT 34 described later is determined as YES according to the notification signal, the processor 41 commands the movement mechanism 20 to stop moving before proceeding to ACT 36.

Further, in this case, in ACT 34, the processor 41 may confirm whether the position of the stage 24 reaches the end point PB based on the position information, and determine as YES when the position of the stage 24 reaches the end point PB to command the movement mechanism 20 to stop rotating.

Here, a rotation speed of the driving source 21 is determined such that a time for moving the stage 24 from the start point PA to the end point PB is sufficiently longer than a time required for performing a series of processing for reading the tag data sequentially from each of the wireless tags 2. Therefore, the baseband processor 31 repeatedly performs a series of processing for reading the tag data sequentially from each of the commodity tags 2 and the reference tag 3 a plurality of times while the stage 24 is moved from the start point PA to the end point PB.

As the time for moving the stage 24 from the start point PA to the end point PB is increased, the number of times the tag data of one commodity tag 2 is read is increased, so that determination accuracy of a phase change described later will be improved. However, elongation of this time may cause elongation of an execution time of the reading processing, which may bring absurdity to operation on the store side. Therefore, the rotation speed of the driving source 21 is appropriately determined by, for example, the designer of the tag reading device 1 while considering the above circumstances.

In ACT 37, the processor 41 determines a reference phase change. The reference phase change is a change associated with a position change of the antenna 10 in a phase when the tag data is read from the reference tag 3. For example, the processor 41 extracts all the data records REA in which the tag code of the reference tag 3 is set in the field FAA from the reading list. The processor 41 obtains an approximate curve when intersections of the phases and the positions indicated by the phase information and the position information set in the fields FAB and FAC of the extracted data records REA are plotted in a coordinate system with a vertical axis as the phase and a horizontal axis as the position of the antenna 10. Processing for obtaining the approximate curve is an example of regression analysis. Therefore, the processor 41 can use a well-known processing algorithm for the regression analysis in the processing here.

Figure 8:
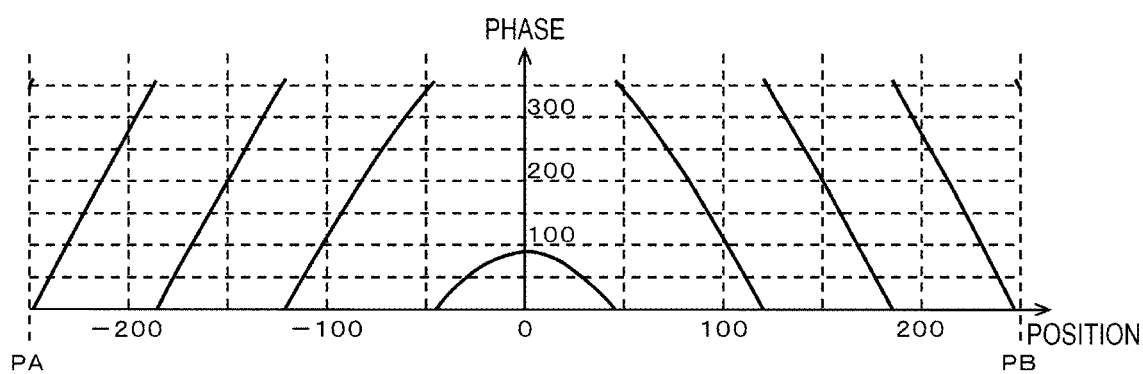
FIG. 8 is a diagram illustrating an example of an approximate curve indicating a relationship between an antenna position and a phase.

FIG. 8 is a diagram illustrating an example of the approximate curve obtained as described above.

In a horizontal axis direction in FIG. 8, a position corresponding to a midpoint between the start point PA and the end point PB is set as a reference position "0", and a separation distance from the reference position in an x-axis direction is indicated by a negative value for the start point PA side, and indicated by a positive value for the end point PB side.

Here, the phase indicated by the phase information is a value from 0° to 360°, which may cause occurrence of places where the value jumps from 0° to 360° or from 360° to 0°. Therefore, the processor 41 obtains a curve (hereinafter, referred to as a phase change curve) by connecting the places where the value jumps from 0° to 360° or from 360° to 0° by giving an offset of +360° or −360° at a place at which the phase changes beyond a first threshold set as a value slightly smaller than 360°, for example, 350°.

Figure 9:
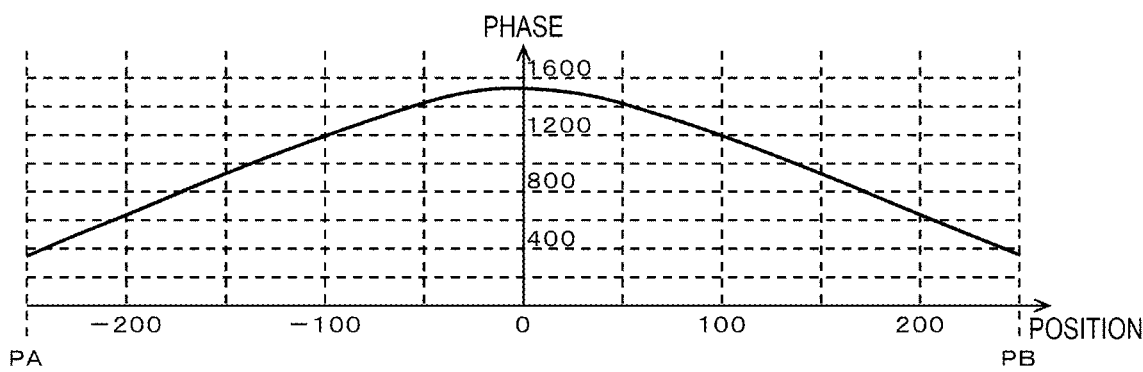
FIG. 9 is a diagram illustrating an example of a phase change curve.

FIG. 9 is a diagram illustrating an example of the phase change curve obtained from the curve illustrated in FIG. 8.

The processor 41 sets a phase change indicated by the phase change curve obtained as illustrated in FIG. 9 as the reference phase change.

FIG. 9 illustrates a phase change curve when a wireless tag is present at a position at which an x coordinate coincides with the midpoint between the start point PA and the end point PB. An x coordinate of the position of the reference tag 3 illustrated in FIG. 1 is different from the x coordinate of the midpoint between the start point PA and the end point PB. Therefore, a phase change curve actually obtained relating to the reference tag 3 is different from that in FIG. 9.

Figure 10:
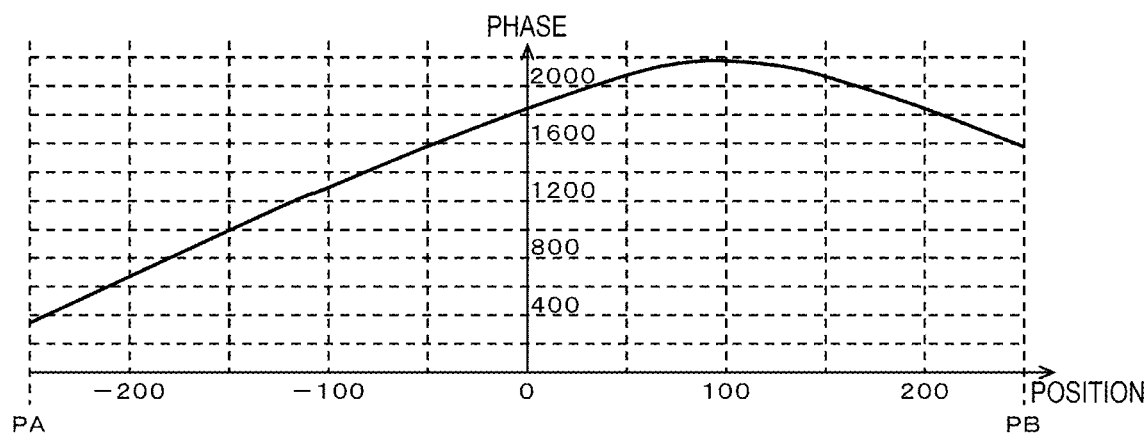
FIG. 10 is a diagram illustrating an example of the phase change curve.
Figure 11:
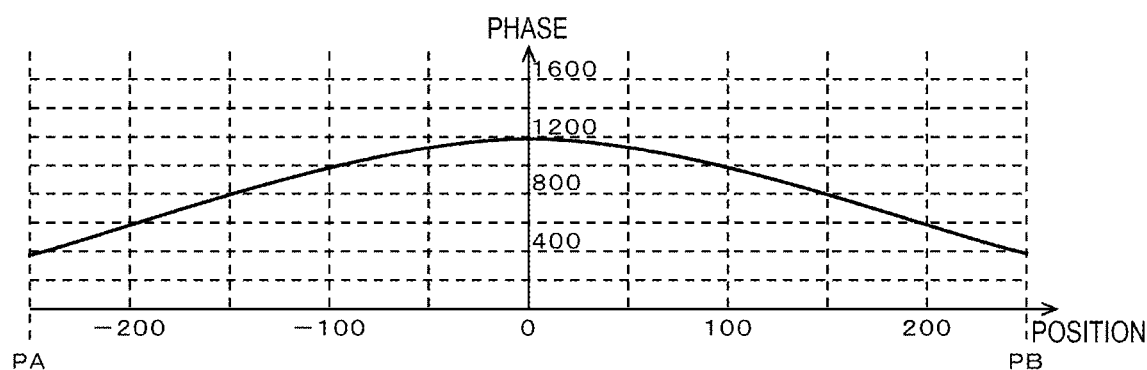
FIG. 11 is a diagram illustrating an example of the phase change curve.

FIGS. 10 and 11 are diagrams illustrating different phase change curves. FIGS. 10 and 11 illustrate examples of phase change curves obtained for wireless tags located at positions different from the position of the wireless tag relating to the phase change curve illustrated in FIG. 9.

For example, a phase change curve as illustrated in FIG. 10 is obtained for a wireless tag located at a position at which a y coordinate is substantially the same as that of the position of the wireless tag relating to the phase change curve illustrated in FIG. 9 and an x coordinate is about 100 mm closer to the end point PB side.

For example, a phase change curve as illustrated in FIG. 11 is obtained for a wireless tag located at a position at which an x coordinate is substantially the same as that of the position of the wireless tag relating to the phase change curve illustrated in FIG. 9 and a separation distance from a straight line connecting the start point PA and the end point PB is larger. Accordingly, a phase change curve having a characteristic corresponding to the position of the wireless tag can be obtained.

In ACT 38 in FIG. 7, the processor 41 confirms whether the reference phase change determined in ACT 37 is appropriate. If the large change in the environment due to a disturbance as described in the first embodiment does not occur, the characteristic of the reference phase change is close to a known characteristic. The characteristic of the reference phase change can be captured, for example, as a vertex position, continuity, smoothness, presence or absence of convexes and concaves, or the like in the phase change curve.

For example, the processor 41 divides the start point PA to the end point PB into a plurality of sections, and obtains a minimum value and a maximum value in each section indicated by the phase change curve. Then, when a difference between the maximum value and the minimum value obtained in the same section is larger than a predetermined second threshold, the processor 41 assumes that the reference phase change is discontinuous or is not smooth, and determines that the reference phase change is not appropriate.

For example, for each of the sections, the processor 41 obtains an average value of values indicated by a phase change curve in the section, obtains a difference in the average value from an adjacent section in a certain direction of the section, and counts the number of convexes and concaves as the number of places where a sign of the difference changes (hereinafter referred to as sign change points). Then, when the number of convexes and concaves is larger than a predetermined third threshold, the processor 41 determines that the reference phase change is not appropriate due to the presence of the convexes and concaves.

For example, when the above-described sign change points are localized only in one or a predetermined plural number of continuous sections, the processor 41 determines that the sign change points are vertex positions. Then, when the vertex positions deviate from a predetermined allowable range including a position determined according to the position of the reference tag 3, the processor 41 assumes that the vertex positions are not appropriate, and determines that the sign change points are not appropriate.

The sign change points are originally generated only at one place of the antenna position at which the separation distance between the reference tag 3 and the antenna 10 is minimum, and are originally "1". Therefore, in principle, the third threshold may be set to, for example, "1", and the processor 41 may determine that the signal change points are not appropriate if the number of the convexes and concaves is equal to or larger than the third threshold. However, due to influences of a phase measurement error or the like, a plurality of sign change points may be generated separately in the vicinity of the sign change relating to the antenna position. Therefore, the third threshold is preferably set to an appropriate value equal to or greater than 2 so as to ignore these sign change points.

The first threshold, the second threshold, and the third threshold may also be determined by, for example, the designer of the tag reading device 1 based on an experiment, a simulation, an empirical rule, or the like.

Then, if none of predetermined application conditions are satisfied in at least one of the plurality of determinations, the processor 41 assumes that the reference phase change is appropriate, and determines as YES and proceeds to ACT 39.

In ACT 39, the processor 41 selects one of the commodity tags 2 as the target tag. For example, when one of the data records REA included in the reading list is selected and the tag code set in the field FAA of the data record REA is not the tag code of the reference tag 3, the processor 41 sets the commodity tag 2 identified by the tag code as the target tag.

In ACT 40, the processor 41 determines a phase change relating to the target tag. For example, as in ACT 37, the processor 41 obtains a phase change curve relating to a phase recorded in the reading list relating to the target tag, and determines the phase change of the target tag as a phase change indicated by the phase change curve.

In ACT 41, the processor 41 confirms whether the target tag is located within the reading area by comparing the phase change determined in ACT 40 with the reference phase change determined in ACT 37.

When a vertex appears in the phase change curve obtained in ACT 40, gentleness of the phase change curve can be evaluated based on an average value of sections apart from a section including the vertex by a certain section. A smaller corresponding average value, that is, a gentler phase change curve, indicates a larger separation distance of the target tag from a moving trajectory of the antenna 10 to a perpendicular direction. In the present embodiment, if the separation distance of the target tag from the moving trajectory of the antenna 10 in the perpendicular direction is smaller than a separation distance of the reference tag 3 from the moving trajectory of the antenna 10 in the perpendicular direction, the target tag is located within the reading area. Therefore, for example, if the average value is equal to or less than an average value of the same section relating to the phase change curve obtained in ACT 37 relating to the reference tag 3, the processor 41 determines that the target tag is located within the reading area. Then, if it is determined that the target tag is located within the reading area, the processor 41 determines as YES in ACT 41 and proceeds to ACT 42.

Figure 12:
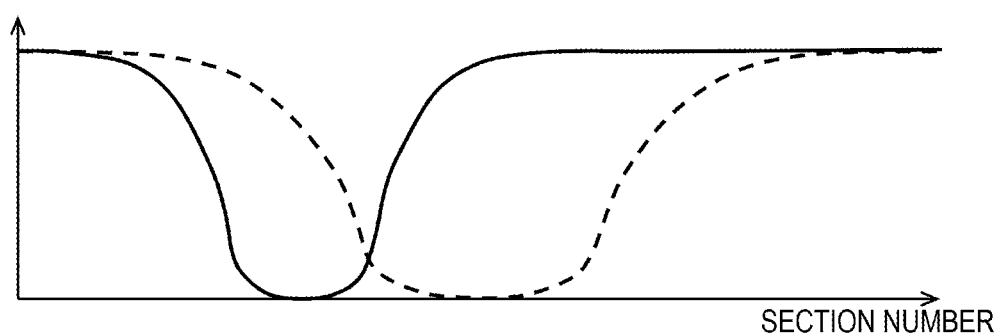
FIG. 12 is a diagram explaining characteristics of the phase change curve.

FIG. 12 illustrates an example of approximate curves when absolute values of the differences calculated as described above relating to each of the sections are plotted with the absolute value of the difference as a vertical axis and the section number as a horizontal axis. The section number is a number assigned to each of a plurality of sections in ascending order from the start point PA side, for example.

In FIG. 12, a curve indicated by a solid line and a curve indicated by a broken line respectively relate to different wireless tags.

In the curves illustrated in FIG. 12, the absolute value in the section including the position at which the vertex appears in the phase change curve is 0. That is, FIG. 12 illustrates an example in which an x coordinate of a position of a wireless tag corresponding to the curve indicated by the solid line is closer to the start point PA than an x coordinate of a position of a wireless tag corresponding to the curve indicated by the broken line. In FIG. 12, since the curve indicated by the broken line is gentler than the curve indicated by the solid line, a y coordinate of the position of the wireless tag corresponding to the curve indicated by the solid line is closer to y coordinates of the start point PA and the end point PB than a y coordinate of the position of the wireless tag corresponding to the curve indicated by the broken line.

In ACT 42, the processor 41 updates the commodity list. For example, when ACT 42 is executed for the first time after starting the reading, the processor 41 generates a new commodity list including only one commodity code included in the tag code of the target tag or one commodity code previously associated with the tag code of the target tag. When ACT 41 is executed starting from the second time, the processor 41 adds a commodity code of the target tag to the commodity list if the commodity code is not included in the commodity list, and increases a quantity of the commodity code by one if the commodity code is included. The commodity list is stored in the main memory 42 or the auxiliary storage unit 43.

When the update of the commodity list is ended, the processor 41 proceeds to ACT 43. If the average value is not equal to or less than an average value of the same section relating to the phase change curve obtained in ACT 37 relating to the reference tag 3, the processor 41 assumes that the target tag is not located within the reading area, and determines as NO in ACT 41 and proceeds to ACT 43 skipping ACT 42. That is, the processor 41 does not add the commodity MEA attached with the wireless tag 2 located outside the area to the commodity list. At this time, the processor 41 assumes that the signal received from the target tag is invalid, and discards the reading result from the target tag. Thus, by the processor 41 reading based on the information processing program, the computer including the processor 41 as a central part functions as a determination unit based on the regression analysis.

If an x coordinate of the position of the commodity tag 2 is within a range from an x coordinate of the start point PA to an x coordinate of the end point PB, a vertex appears in the phase change curve obtained in ACT 40. However, if the x coordinate of the position of the commodity tag 2 is out of the range, no vertex is present in the phase change curve. In the present embodiment, as illustrated in FIG. 1, a position at which an x coordinate deviates from the range from the x coordinate of the start point PA to the x coordinate of the end point PB is not in the basket BAA. Therefore, for example, when no vertex is present in the phase change curve, the processor 41 may also determine that the target tag is located outside the reading area. When this determination is performed by the processor 41, the x coordinates of the start point PA and the end point PB may be set in the vicinity of an x coordinate of a boundary of the reading area.

In ACT 43, the processor 41 confirms whether all of the wireless tags 2 whose tag data could be read in the reading period are selected as target tags. If wireless tags 2 to be selected as the target tags remain, the processor 41 determines as NO and repeats the processing starting from ACT 39. In this case, in ACT 39, the processor 41 selects a wireless tag 2 that is not selected as the target tag. Accordingly, the processor 41 repeats the processing of ACT 39 to ACT 43 while sequentially setting the wireless tags 2 whose tag data could be read in the reading period as the target tags.

Then, if the wireless tags 2 whose tag data could be read in the reading period are selected as the target tags, the processor 41 determines as YES in ACT 43 and proceeds to ACT 44. In ACT 44, the processor 41 notifies the POS terminal 4 of the commodity list. Then, the processor 41 ends the reading.

Incidentally, when a large change in the environment occurs due to a disturbance and a large change occurs in the characteristic of the phase change curve obtained in ACT 37, the processor 41 confirms that any of the application conditions in ACT 38 is satisfied, and determines as NO in ACT 38 and proceeds to ACT 45.

In ACT 45, the processor 41 performs alarm processing in the same manner as in ACT 21 in FIG. 4. Then, when the alarm processing is ended, the processor 41 ends the reading. In this case, the processor 41 does not execute ACT 39 to ACT 44.

As described above, the tag reading device 1 according to the second embodiment determines whether the position of the commodity tag 2 is within the placement area by comparing a phase change relating to the reference tag 3 when the commodity tag 2 and the reference tag 3 are read a plurality of times while moving the antenna 10 and the phase change relating to the commodity tag 2. The tag reading device 1 uses a tag code read from the commodity tag 2 determined to be located within the placement area as a valid tag code. Therefore, according to the tag reading device 1, even the communication with the commodity tag 2 located outside the placement area is possible, and a commodity tag 2 that is not guaranteed to be located within the placement area can be prevented from being read as a valid commodity tag 2.

In addition, when a phase change different from the phase change occurring in a normal environment is obtained relating to the reference tag 3 in which the change in the separation distance from the antenna 10 due to the movement of the antenna 10 is known, the change in the environment is large and whether the commodity tag 2 is within the placement area may not be correctly determined, or the communication with the commodity tag 2 may not be normally performed. Therefore, the tag reading device 1 according to the second embodiment issues an alarm without generating the commodity list based on the reading result. This prevents erroneous commodity registration in such an environment. Based on the alarm, the customer or the clerk can take measures such as removing the cause of the disturbance, and can quickly perform the commodity registration in a normal environment.

This embodiment can be variously modified as follows.

In each embodiment, a determination result as to whether the commodity tag 2 is within the placement area may be used by any method. For example, the tag reading device 1 may output the tag data read only when it is determined that the commodity tag 2 is within the placement area without creating a commodity list. Alternatively, for example, the tag reading device 1 may generate list data in which each piece of the read tag data is indicated and information indicating the determination result of whether the commodity tag 2 is within the placement area is associated with the tag data. Alternatively, for example, a device may be considered for determining whether a wireless tag 2 identified by a designated tag code is present in the placement area.

Instead of moving the antenna 10, the table TAA may be moved. Alternatively, both the antenna 10 and the table TAA may be moved.

A plurality of reference tags 3 may be provided at different positions, and a final determination about the abnormality and inside or outside the area may be performed based on the determination result performed as in each of the embodiments based on each of the plurality of reference tags 3.

The reference tag 3 may be attached by any method. For example, the reference tag 3 may be attached to the basket BAA. Alternatively, for example, the reference tag 3 may be attached to a component of the tag reading device 1 not illustrated in FIG. 1, or a support member attached to these components or the table TAA. Further, the reference tag 3 may be attached to a member different from the component of the tag reading device 1 and disposed in the vicinity of the tag reading device 1, or a support member attached to the member.

The reading target tag is not limited to the commodity tag 2 attached to the commodity MEA, and may be attached to any object other than the commodity MEA.

Some or all of the functions implemented by the processor 41 by the information processing may be implemented by hardware that executes the information processing that is not based on a program such as one or more logic circuits. Further, each of the functions may be implemented by combining software control with the hardware such as one or more logic circuits.

While certain embodiments have been described, these embodiments have been presented by way of example only, and are not intended to limit the scope of the invention. These new embodiments can be implemented in other various forms, and various omissions, replacements, and changes can be made without departing from the spirit of the invention. These embodiments and modifications thereof are included in the scope and the gist of the invention and included in the inventions described in claims and the scope of equivalents of the inventions.

What is claimed is:

1. A commodity registration system comprising:
    a reference tag configured to couple to or embed in a table or surface;
    an antenna;
    an actuator configured to reposition the antenna between a first position underneath the table or surface and a second position underneath the table or surface; and
    a control system configured to:
        use the antenna to acquire (i) one or more reference signals wirelessly transmitted from the reference tag whose relative position to the antenna is known and (ii) one or more target signals wirelessly transmitted from a target tag attached to a commodity for purchase that is placed on or proximate the table or surface, the target tag different from the reference tag, wherein the one or more reference signals include a first reference signal acquired by the antenna at the first position and a second reference signal acquired by the antenna at the second position, and wherein the one or more target signals include a first target signal acquired by the antenna at the first position and a second target signal acquired by the antenna at the second position;
        determine that the one or more target signals transmitted from the target tag are invalid based on a phase characteristic of the one or more reference signals transmitted from the reference tag, wherein the phase characteristic of the one or more reference signals is a threshold phase difference determined based on a reference phase difference between the first reference signal and the second reference signal;
        determine a target phase difference between the first target signal and the second target signal;
        register the commodity for purchase in response to the target phase difference being less than the reference phase difference; and
        refrain from registering the commodity for purchase in response to the target phase difference being greater than the threshold phase difference.

2. The commodity registration system of claim 1, wherein the actuator includes a motor, an output shaft coupled to the motor, a rail coupled to the output shaft, and a stage coupled to the rail, wherein the antenna is coupled to the stage, and wherein the motor is configured to drive the output shaft to cause the antenna to translate relative to the reference tag along the rail between the first position and the second position.

3. The commodity registration system of claim 1, wherein the reference tag is positioned closer to the first position than the second position.

4. The commodity registration system of claim 1, wherein the control system is configured to issue an alarm in response to the threshold phase difference being outside of a preset range.

5. A commodity registration system comprising:
    an antenna;
    an actuator configured to reposition the antenna between a first position and a second position; and
    a control system configured to:
        use the antenna to acquire one or more reference signals wirelessly transmitted from a reference tag whose relative position to the antenna is known, the one or more reference signals including a first reference signal acquired by the antenna at the first position and a second reference signal acquired by the antenna at the second position;
        use the antenna to acquire one or more target signals wirelessly transmitted from a target tag coupled to a commodity and different from the reference tag, the one or more target signals including a first target signal acquired by the antenna at the first position and a second target signal acquired by the antenna at the second position;
        determine a reference phase difference between the first reference signal and the second reference signal;
        determine a target phase difference between the first target signal and the second target signal;
        register the commodity for purchase in response to the target phase difference being less than the reference phase difference; and
        refrain from registering the commodity for purchase in response to the target phase difference being greater than the reference phase difference.

6. A commodity registration system comprising:
    an antenna;
    an actuator configured to reposition the antenna between a first position and a second position; and
    a control system configured to:
        use the antenna to acquire one or more reference signals wirelessly transmitted from a reference tag whose relative position to the antenna is known, the one or more reference signals including a plurality of reference signals acquired by the antenna at a plurality of positions between the first position and the second position;
        use the antenna to acquire one or more target signals wirelessly transmitted from a target tag coupled to a commodity and different from the reference tag, the one or more target signals include a plurality of target signals acquired by the antenna at a plurality of positions between the first position and the second position; and determine a reference phase change curve between the first position and the second position based on a phase of each of the plurality of reference signals acquired between the first position and the second position;

determine a target phase change curve between the first position and the second position based on a phase of each of the plurality of target signals acquired at a plurality of positions between the first position and the second position;

register the commodity for purchase in response to a curvature of the target phase change curve being gentler than a curvature of the reference phase change curve; and refrain from registering the commodity for purchase in response to the curvature of the target phase change curve being more abrupt than the curvature of the reference phase change curve.

\* \* \* \* \*